United States Patent
Mori

(10) Patent No.: US 10,616,472 B2
(45) Date of Patent: Apr. 7, 2020

(54) ELECTRONIC APPARATUS, METHOD OF CONTROLLING ELECTRONIC APPARATUS, AND RECORDING MEDIUM

(71) Applicant: CANON KABUSHIKI KAISHA, Tokyo (JP)

(72) Inventor: Naomi Mori, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 192 days.

(21) Appl. No.: 15/936,152

(22) Filed: Mar. 26, 2018

(65) Prior Publication Data
US 2018/0316848 A1 Nov. 1, 2018

(30) Foreign Application Priority Data

Apr. 27, 2017 (JP) ................. 2017-088627

(51) Int. Cl.
*H04N 5/232* (2006.01)
*G06F 3/0482* (2013.01)

(52) U.S. Cl.
CPC ......... *H04N 5/23216* (2013.01); *H04N 5/232* (2013.01); *H04N 5/23222* (2013.01); *H04N 5/23245* (2013.01); *H04N 5/23293* (2013.01); *G06F 3/0482* (2013.01)

(58) Field of Classification Search
CPC .. G06F 3/0482; H04N 5/232; H04N 5/23216; H04N 5/23222; H04N 5/23245; H04N 5/23293
See application file for complete search history.

(56) References Cited

U.S. PATENT DOCUMENTS

| | | | | |
|---|---|---|---|---|
| 9,489,119 | B1* | 11/2016 | Smith, Jr. | G06F 3/0486 |
| 10,129,482 | B2* | 11/2018 | Yamaguchi | H04N 5/23293 |
| 2009/0327963 | A1* | 12/2009 | Mouilleseaux | G06F 3/0482 715/834 |
| 2012/0281101 | A1* | 11/2012 | Fujinawa | H04N 1/00127 348/207.1 |
| 2014/0096048 | A1* | 4/2014 | Rottler | G06F 3/0486 715/769 |
| 2016/0170636 | A1* | 6/2016 | Lee | G06F 3/04817 715/773 |
| 2017/0153807 | A1* | 6/2017 | Duan | G06F 3/04883 |

FOREIGN PATENT DOCUMENTS

JP 2006-270594 A 10/2006

\* cited by examiner

*Primary Examiner* — Amy R Hsu
(74) *Attorney, Agent, or Firm* — Canon U.S.A., Inc. IP Division

(57) ABSTRACT

An electronic apparatus which is a first electronic apparatus includes an acquiring unit configured to acquire second correspondence information and second select-item information indicating one or more second select-items selected from a plurality of second items in a predetermined menu in a second electronic apparatus, and a control unit configured to perform control to generate first select-item information indicating one or more first select-items selected in the predetermined menu in the first electronic apparatus based on the one or more second select-items selected in the second electronic apparatus, using the acquired second select-item information and one correspondence information out of first correspondence information and the second correspondence information.

20 Claims, 12 Drawing Sheets

FIG.4A
MODEL A

| No. | NAME OF MENU ITEM |
|---|---|
| 1 | RECORDING IMAGE QUALITY |
| 2 | WHITE BALANCE |
| 3 | FLASH CONTROL |
| 4 | EXTERNAL FLASH CONTROL |
| 5 | PERIPHERAL ILLUMINATION CORRECTION |
| 6 | FINDER LEVEL DISPLAY |
| 7 | FINDER GRID DISPLAY |
| 8 | IN-FINDER DISPLAY |
| 9 | MENU 1 |
| 10 | MENU A |
| 11 | MENU B |
| 12 | MENU C |
| ⋮ | ⋮ |
| n-1 | SETTING OF GPS |
| n | SETTING OF GPS AND ELECTRONIC COMPASS |

FIG.4B
MODEL A

| |
|---|
| 1 |
| 2 |
| 4 |
| 5 |
| 9 |
| ⋮ |
| n |

FIG.4C
MODEL B

| No. | NAME OF MENU ITEM |
|---|---|
| 1 | RECORDING IMAGE QUALITY |
| 2 | WHITE BALANCE |
| 3 | FLASH CONTROL |
| 4 | EXTERNAL FLASH CONTROL |
| 5 | PERIPHERAL ILLUMINATION CORRECTION |
| 6 | FINDER LEVEL DISPLAY |
| 7 | FINDER GRID DISPLAY |
| 8 | IN-FINDER DISPLAY |
| 9 | MENU 1 |
| 10 | MENU A |
| 11 | MENU B |
| 12 | MENU C |
| ⋮ | ⋮ |
| n-1 | SETTING OF GPS |
| n | SETTING OF GPS AND ELECTRONIC COMPASS |
| n+1 | LENS OPTICAL CORRECTION |
| n+2 | TIME LAPSE MOVING IMAGE |

FIG.4D
MODEL B

| |
|---|
| 1 |
| 2 |
| 3 |
| 6 |
| 7 |
| 10 |
| 11 |
| 12 |
| ⋮ |
| n |
| n+1 |
| n+2 |

FIG.5A
MY MENU INFORMATION

| | |
|---|---|
| NUMBER OF TABS | 501 |
| NAME OF TAB 1 | 502(510) |
| NUMBER OF MENU ITEMS IN TAB 1 | 503(510) |
| MENU ITEM 1 IN TAB 1 | 504(510) |
| ... | |
| MENU ITEM n IN TAB 1 | 504(510) |

FIG.5B

| | |
|---|---|
| PRODUCT NAME | 505 |
| VERSION OF CORRESPONDENCE INFORMATION | 506 |
| SIZE OF CORRESPONDENCE INFORMATION | 507 |
| CORRESPONDENCE INFORMATION OF MODEL N | 508 |
| INFORMATION OF MY MENU | 509 |

FIG.5C
CORRESPONDENCE INFORMATION OF MODEL A

| | |
|---|---|
| 3 | 4 |
| 6 | 8 |
| 7 | 8 |
| 12 | 9 |
| 10 | 9 |
| 11 | 9 |
| n-1 | n |

FIG.5D
CORRESPONDENCE INFORMATION OF MODEL B

| | |
|---|---|
| 3 | 4 |
| 6 | 8 |
| 7 | 8 |
| 12 | 9 |
| 10 | 9 |
| 11 | 9 |
| n-1 | n |
| 5 | n+1 |

FIG.5E

| | |
|---|---|
| 3 | 501a |
| mymenu1 | 502a |
| 4 | 503a |
| 1 | 504a |
| 8 | 504a |
| 5 | 504a |
| 9 | 504a |
| mymenu2 | |
| ... | |

FIG.5F

| | |
|---|---|
| 3 | 501b |
| mymenu1 | 502b |
| 6 | 503b |
| 1 | 504b |
| 6 | 504b |
| 7 | 504b |
| n+1 | 504b |
| 12 | 504b |
| 10 | 504b |
| mymenu2 | |
| ... | |

FIG.5G
READING CANDIDATE LIST

| | |
|---|---|
| 1 | PRIORITY 0 |
| 6 | PRIORITY 1 |
| 7 | PRIORITY 2 |
| n+1 | PRIORITY 1 |
| 12 | PRIORITY 1 |
| 10 | PRIORITY 2 |
| 11 | PRIORITY 3 |

FIG.5H
DISPLAY CANDIDATE LIST

| | |
|---|---|
| 1 | PRIORITY 0 |
| 6 | PRIORITY 0 |
| n+1 | PRIORITY 0 |
| 12 | PRIORITY 0 |
| 7 | PRIORITY 0 |
| 10 | PRIORITY 0 |
| 11 | PRIORITY 3 |

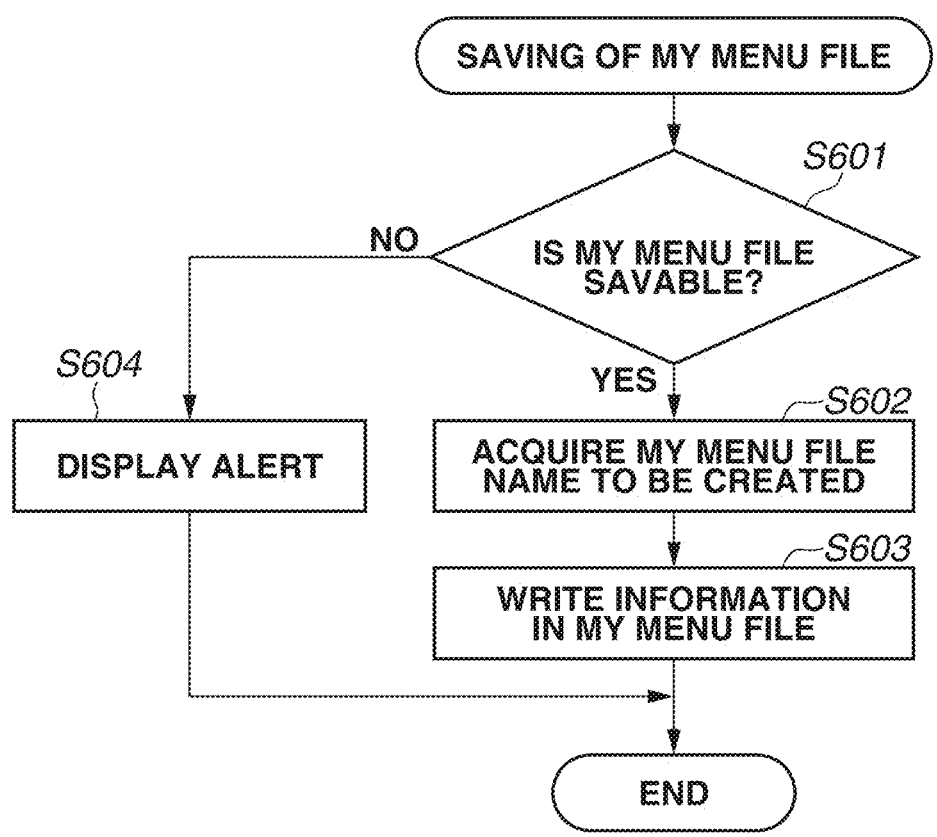

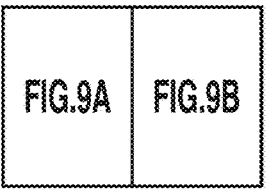
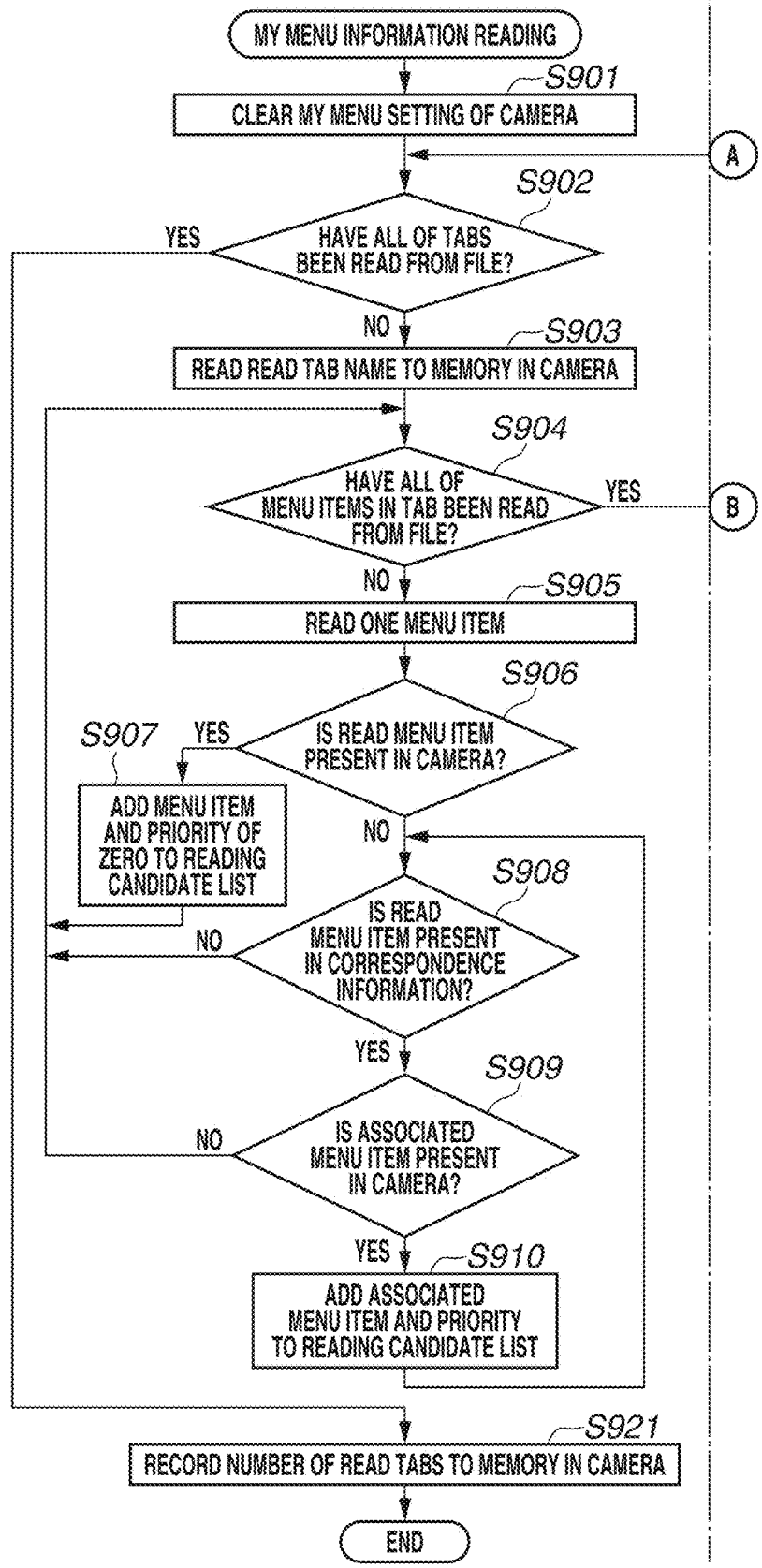
FIG.9A

ELECTRONIC APPARATUS, METHOD OF CONTROLLING ELECTRONIC APPARATUS, AND RECORDING MEDIUM

BACKGROUND

Field of the Disclosure

The present disclosure relates to an electronic apparatus, a method of controlling the electronic apparatus, and a recording medium.

Description of the Related Art

There is a method that enables rapid operation of a user-desired menu through registration of user-desired menu items.

Japanese Patent Application Laid-Open No. 2006-270594 discloses that operation menu information is settable for each user, and a version of the operation menu information is compared with a version of operation menu information in another model connected through a network and a newly-set operation menu is updated in each model. Further, it is disclosed that update according to used language of each model is performed in the update of the operation menu.

In the method disclosed in Japanese Patent Application Laid-Open No. 2006-270594, it is necessary to connect the apparatuses to each other through the network in order to cause an apparatus to take over the user-desired menu item that has been set in the other apparatus. Therefore, for example, a method in which the user-desired menu item is recorded in a recording medium and is taken over by the other apparatus can be considered. However, if the version of the menu item is different between the apparatuses, the desired menu item may not be displayed in a successor apparatus because a configuration of a menu hierarchy set in a previous apparatus and the name of the menu item are different from those of the menu in the successor model.

SUMMARY

According to an aspect of the present invention, an electronic apparatus which is a first electronic apparatus includes an acquiring unit configured to acquire second correspondence information indicating correspondence between a plurality of second items settable in a predetermined menu in a second electronic apparatus which is different from the first electronic apparatus and a plurality of items settable in the predetermined menu in one or more other electronic apparatus different from the second electronic apparatus, the acquiring unit being configured to acquire second select-item information indicating one or more second select-items selected from the plurality of second items in the predetermined menu in the second electronic apparatus, and a control unit configured to perform control to generate first select-item information indicating one or more first select-items selected in the predetermined menu in the first electronic apparatus based on the one or more second select-items selected in the second electronic apparatus, using the acquired second select-item information and one correspondence information out of first correspondence information and the second correspondence information. The first correspondence information indicating correspondence between a plurality of first items settable in the predetermined menu in the first electronic apparatus and a plurality of items settable in the predetermined menu in one or more other electronic apparatus different from the first electronic apparatus.

According to another aspect of the present invention, an electronic apparatus includes a control unit configured to perform, in a case where an instruction to record select-item information indicating one or more select-items selected from a plurality of items settable in a predetermined menu in the electronic apparatus is inputted, control to record correspondence information together with the select-item information in a recording medium, the correspondence information indicating correspondence between a plurality of items settable in the predetermined menu in the electronic apparatus and a plurality of items settable in the predetermined menu in one or more other electronic apparatus different from the electronic apparatus.

Further features of the present invention will become apparent from the following description of exemplary embodiments with reference to the attached drawings.

BRIEF DESCRIPTION OF THE DRAWINGS

FIGS. 4A to 4D are diagrams each illustrating an example of a table stored in a nonvolatile memory of the digital camera.

FIGS. 5A to 5H are diagrams illustrating examples of My Menu information, My Menu file, correspondence information, and a candidate list.

FIG. 6 is a flowchart illustrating an example of save processing of the My Menu file.

DESCRIPTION OF THE EMBODIMENTS

Exemplary embodiments of the present invention are described in detail below with reference to the accompanying drawings.

Figure 1:
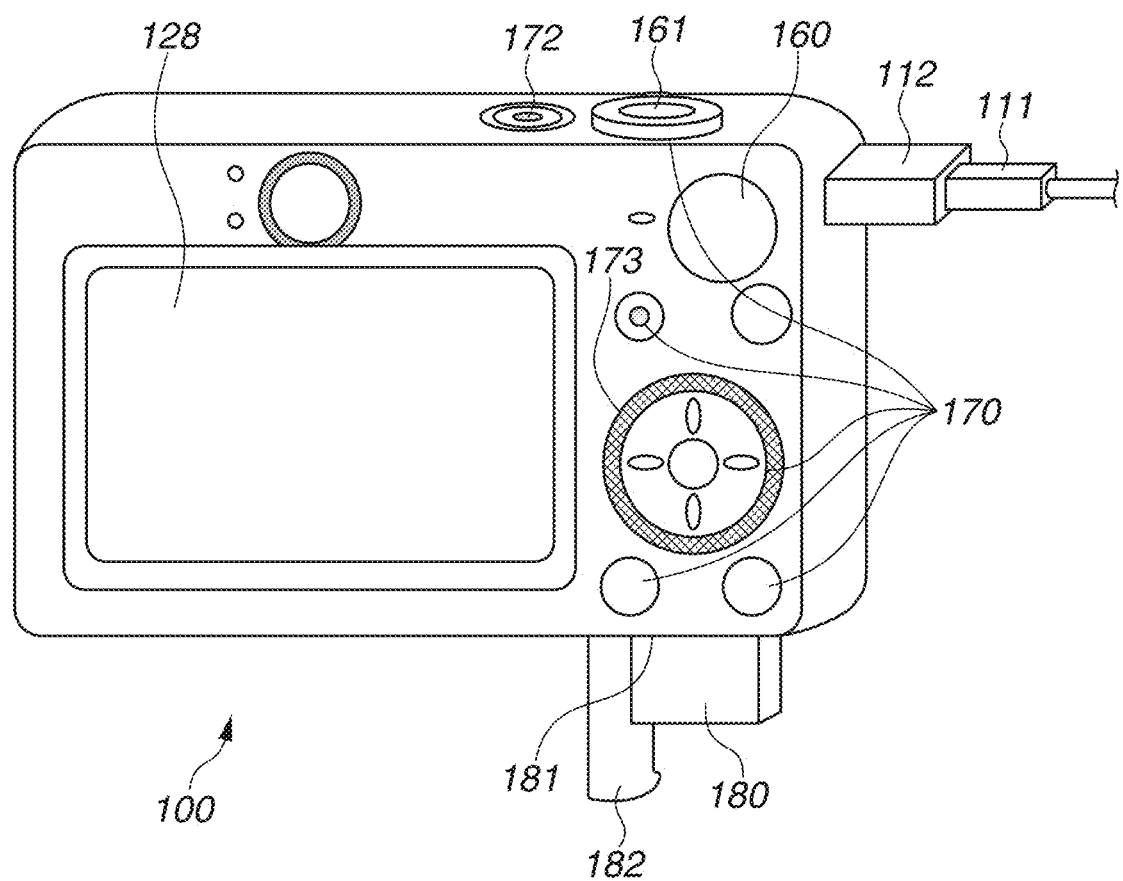
FIG. 1 is a diagram illustrating an example of appearance of a digital camera.

FIG. 1 is an appearance diagram of a digital camera 100 as an example of an electronic apparatus and an imaging apparatus. FIG. 1 is a diagram illustrating an example of the appearance of the digital camera 100.

A display unit 128 displays an image and various kinds of information.

A shutter button 161 is an operation unit to perform an imaging instruction (when shutter button 161 is pressed down, imaging instruction is received at a first stage, and imaging is performed at a second stage).

A mode changeover switch 160 is an operation unit to change a mode among various kinds of modes.

A connector 112 is a connector through which a connection cable 111 for connecting the digital camera 100 with, for example, a personal computer (PC) or a printer, is connected to the digital camera 100.

An operation unit 170 includes operation members such as various kinds of switches, buttons, and a touch panel that receive various kinds of operation from a user.

A controller wheel 173 is an operation member that is included in the operation unit 170 and is rotationally operated.

A power switch 172 is a push button for switching power on and power off.

A recording medium 180 is a nonvolatile recording medium such as a memory card and a hard disk, and holds captured images, image information, and setting information of an imaging control device. For example, information indicating setting of My Menu of the menu screen can be recorded in the recording medium 180. My Menu displays only menu items selected by the user in a list format. The user can select desired items from items included in large categories such as imaging setting, play back setting, and camera setting, of the menu screen, and registers the desired items in My Menu. The My Menu information registered in the digital camera 100 is recorded in the recording medium 180 and is read in the other model, which allows to display and use the list of the user-desired menus in the other model without setting operation of My Menu.

A recording medium slot 181 is a slot for housing the recording medium 180. The recording medium 180 housed in the recording medium slot 181 becomes communicable with the digital camera 100, and becomes writable and readable.

A lid 182 is a lid of the recording medium slot 181. FIG. 1 illustrates a state where the lid 182 is opened, and a part of the recording medium 180 is out and exposed from the recording medium slot 181.

Figure 2:
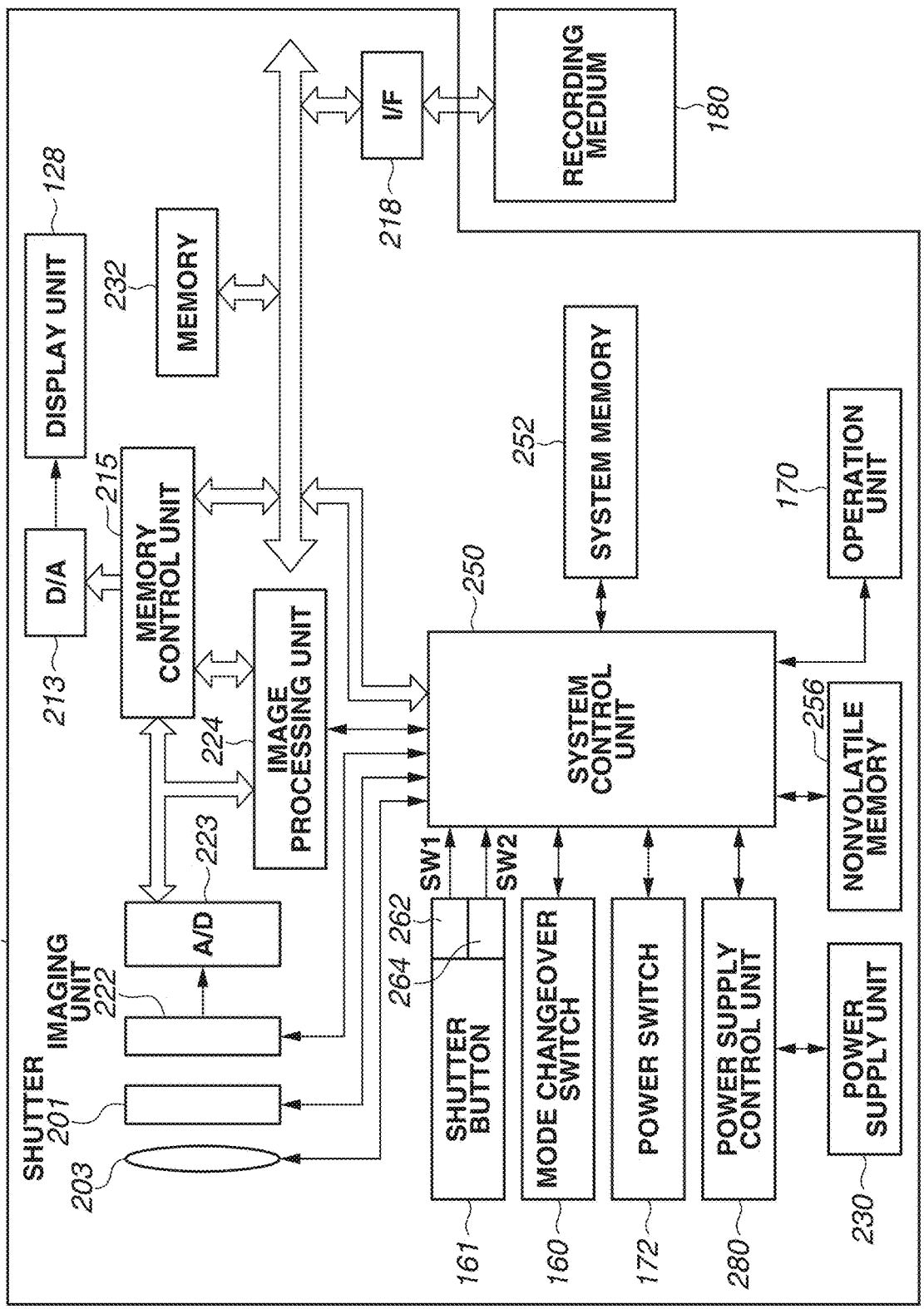
FIG. 2 is a block diagram illustrating an example of a hardware configuration of the digital camera.

FIG. 2 is a diagram illustrating an example of a hardware configuration of the digital camera 100.

In FIG. 2, an imaging lens 203 is a lens group including a zoom lens and a focus lens.

A shutter 201 includes an aperture function.

An imaging unit 222 is an imaging device including a charge-coupled device (CCD) sensor, a complementary metal-oxide semiconductor (CMOS) sensor, or the like that converts an optical image into an electric signal.

An analog-to-digital (A/D) converter 223 is used to convert an analog signal output from the imaging unit 222, into a digital signal.

An image processing unit 224 performs resize processing such as predetermined pixel interpolation and reduction, and color conversion processing on data provided from the A/D converter 223 or data provided from a memory control unit 215. Further, the image processing unit 224 performs predetermined calculation processing with use of captured image data, and a system control unit 250 performs exposure control and ranging control based on an acquired calculation result. As a result, autofocus (AF) processing, automatic exposure (AE) processing, and flash preliminary emission (EF) processing of through-the-lens (TTL) system are performed. The image processing unit 224 further performs predetermined calculation processing with use of the captured image data and performs automatic white balance (AWB) processing of the TTL system, based on an acquired calculation result.

Data output from the A/D converter 223 is written in the memory 232 through the image processing unit 224 and the memory control unit 215, or is directly written in the memory 232 through the memory control unit 215, not through the image processing unit 224.

The memory 232 holds image data that has been obtained by the imaging unit 222 and converted into digital data by the A/D converter 223, and image data to be displayed on the display unit 128. The memory 232 has a memory capacity sufficient to hold predetermined number of still images, and moving images and sound of a predetermined time. Further, the memory 232 also serves as a memory for image display (video memory).

A digital-to-analog (D/A) converter 213 converts the data for image display held by the memory 232, into an analog signal, and supplies the analog signal to the display unit 128. The image data for display that has been written in the memory 232 in such a manner is displayed on the display unit 128 through the D/A converter 213. The display unit 128 performs display corresponding to the analog signal supplied from the D/A converter 213, on a display such as a liquid crystal display (LCD). The digital signal that has been A/D converted by the A/D converter 223 once and accumulated in the memory 232 is converted into an analog signal by the D/A converter 213, and the analog signal is sequentially transferred to and displayed on the display unit 128, In this way, the display unit 128 can function as an electronic view finder. Accordingly, the digital camera 100 can perform through image display (live view display).

A nonvolatile memory 256 is incorporated in the digital camera 100. The nonvolatile memory 256 is a recording medium electrically erasable, writable, and readable by the system control unit 250, and includes, for example, an electrically erasable programmable read-only memory (EEPROM). The nonvolatile memory 256 stores, for example, constants and programs for operating the system control unit 250. The programs indicate computer programs for executing various kinds of flowcharts described below in the present exemplary embodiment.

The system control unit 250 includes one or more processors, and controls the entire digital camera 100. The system control unit 250 executes the programs stored by the above-described nonvolatile memory 256, thereby realizing various processing described below in the present exemplary embodiment. The system memory 252 includes a random access memory (RAM). The constants and variables used for operating the system control unit 250, programs read from the nonvolatile memory 256, and the like are loaded into the system memory 252.

The system control unit 250 loads the programs held by the nonvolatile memory 256 to the system memory 252 and executes the programs. Thus, processing of flowcharts in FIG. 6 to FIG. 9 (consisting of FIGS. 9A and 9B) is realized.

Further, the system control unit 250 performs display control by controlling the memory 232, the D/A converter 213, the display unit 128, and the like.

The mode changeover switch 160, the shutter button 161, and the operation unit 170 are operation devices to provide various kinds of operation instructions to the system control unit 250.

The mode changeover switch 160 switches the operation mode of the system control unit 250 among a still image recording mode, a moving image capturing mode, a play back mode, and other modes. Examples of modes included in the still image recording mode are, for example, an automatic image capturing mode, an automatic scene determination mode, a manual mode, various kinds of scene modes each having an imaging setting for a captured scene, a program AE mode, and a custom mode. The mode is directly switched, by the mode changeover switch 160, to any of these modes included in the menu screen. Alternatively, the screen may be once changed to the menu screen by the mode changeover switch 160, and then the mode may be switched to any of the modes included in the menu screen by another operation member. Likewise, the moving image capturing mode may include a plurality of modes.

At the middle of the operation of the shutter button 161 provided in the digital camera 100, i.e., the shutter button 161 is half-pressed (capturing preparation instruction), a first shutter switch 262 is turned on and generates a first shutter switch signal SW1. The system control unit 250 starts operating the AF processing, the AE processing, the AWB processing, the EF processing, and the like, in response to the first shutter switch signal SW1.

When the operation of the shutter button 161 is completed, i.e., when the shutter button 161 is fully pressed (image capturing instruction), a second shutter switch 264 is turned on and generates a second shutter switch signal SW2. The system control unit 250 starts, in response to the second shutter switch signal SW2, operating a series of image capturing processing that includes the still image capturing operation by the imaging unit 222, signal reading from the imaging unit 222, and writing of the image data in the recording medium 180.

For example, when various function icons displayed on the display unit 128 are selected and operated, functions are appropriately assigned to the respective operation members of the operation unit 170 for each scene, and thus the operation members respectively function as various kinds of function buttons. Examples of the function buttons include an end button, a return button, an image feeding button, a jump button, a narrowing-down button, and an attribute change button. For example, when a menu button is pressed, various kinds of settable menu screens are displayed on the display unit 128. It is possible for the user to intuitively perform various kinds of settings with use of the menu screen displayed on the display unit 128, a four-direction button (left, right, top, and bottom), and a SET button.

The controller wheel 173 is an operation member that is included in the operation unit 170 and is rotationally operated, and is used together with the direction button, for example, to instruct a selection item. When the controller wheel 170 is rotationally operated, an electric pulse signal is generated according to an operated amount. The system control unit 250 controls each of the units of the digital camera 100 based on the pulse signal. It is possible for the system control unit 250 to determine, for example, a rotated angle and the number of rotation times of the controller wheel 173 with use of the pulse signal. The controller wheel 173 may be any operation member as long as the member can detect the rotating operation. For example, the controller wheel 173 may be a dial operation member that itself rotates according to a rotating operation by the user and generates the pulse signal. Further, the controller wheel 173 may be an operation member including a touch sensor that does not rotate but detects a rotating operation or the like of a finger of the user on the controller wheel 173 (so-called touch wheel).

The power supply control unit 280 includes, for example, a battery detection circuit, a DC-DC converter, and a switch circuit that switches a block to be energized, and detects whether a battery is mounted, a kind of the battery, and a remaining amount of the battery. Further, the power supply control unit 280 controls the DC-DC converter based on the detection result and the instruction by the system control unit 250, and supplies a required voltage to each of the units and the recording medium 180 for a required period.

Examples of the power unit 230 includes a primary battery such as an alkali battery and a lithium battery, a secondary battery such as a nickel-cadmium (NiCd) battery and a nickel-metal hydride (NiMH) battery, and an alternate current (AC) adopter.

A recording medium interface (I/F) 218 is an interface with the recording medium 180 such as a memory card and a hard disk.

The recording medium 180 is a nonvolatile recording medium such as a memory card, for recording images in image capturing, and made of, for example, a semiconductor memory, an optical disc, a magnetic disc.

FIGS. 3A to 3G are diagrams each illustrating a display example of the menu screen.

Figure 3A:
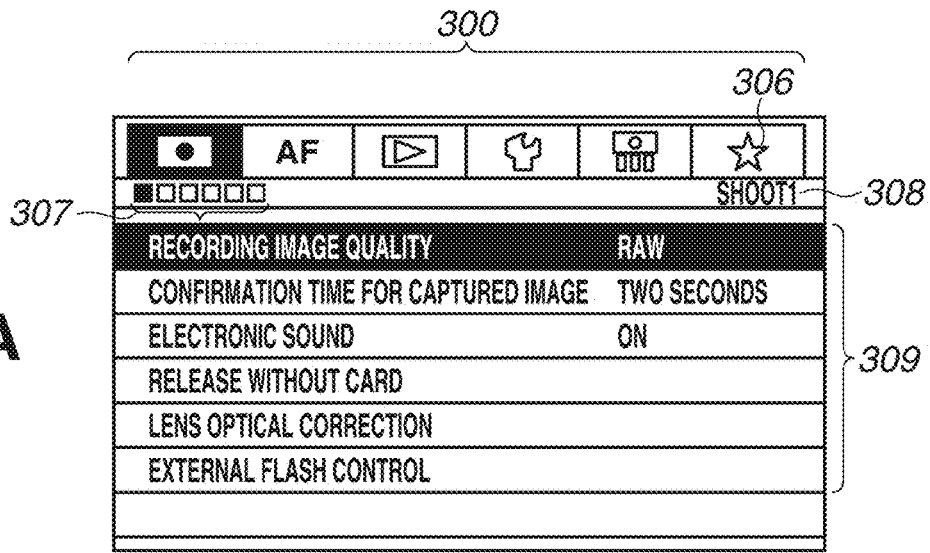
FIGS. 3A to 3G are diagrams each illustrating a display example of a menu screen.

FIG. 3A illustrates an example of a screen displayed on the display unit 128 when the menu button is pressed. As illustrated in FIG. 3A, a list of large tabs arranged in a lateral direction at an upper part of the screen is displayed at a large tab portion 300, and a black-painted portion indicates a focused large tab. A list of small tabs belonging to the focused large tab is displayed at a small tab portion 307, and a black-painted portion indicates a focused small tab. The small tabs each have a small tab name, and a small tab name 308 displays the name of the small tab currently focused. A list of menu items 309 belonging to the currently-focused small tab is displayed at a menu item portion 310, and a black-painted portion indicates a menu item currently focused. Each of the small tabs includes the menu items 309 belonging thereto, and one small tab includes seven menu items at maximum. The menu items 309 belonging to the focused small tab are displayed in the menu item portion 310 according to movement of focus between the small tabs.

The large tabs include a My Menu large tab 306, and the My Menu large tab 306 is displayed in the large tab portion 300.

My Menu is a registration-type menu to which the user optionally can register menu items belonging to each of the tabs other than the My Menu tab. There are a considerable number of menu items along with advancement of the camera functions. Therefore, the menu items that are frequently used by the user are registered to the My Menu tab, which enables the user to reach the desired menu item rapidly.

Figure 3B:
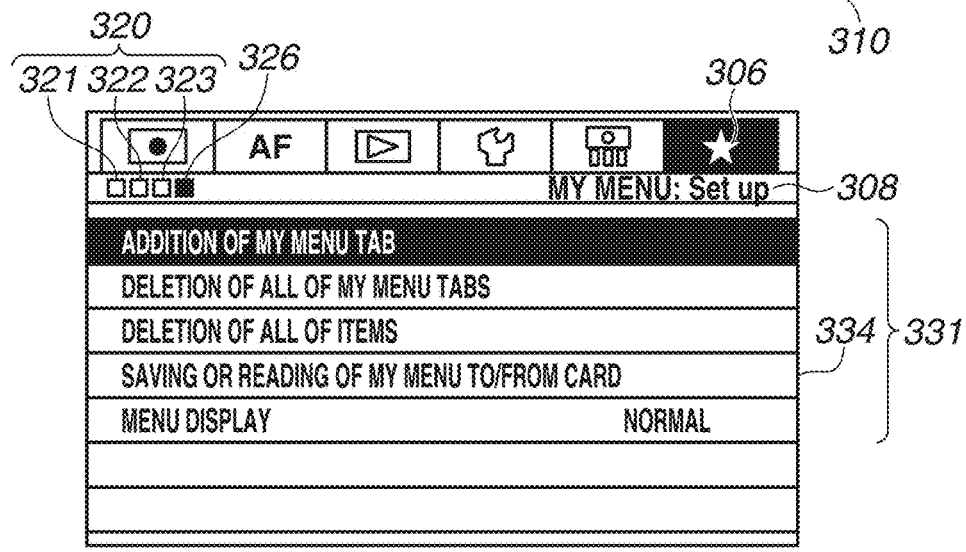
Figure 3C:
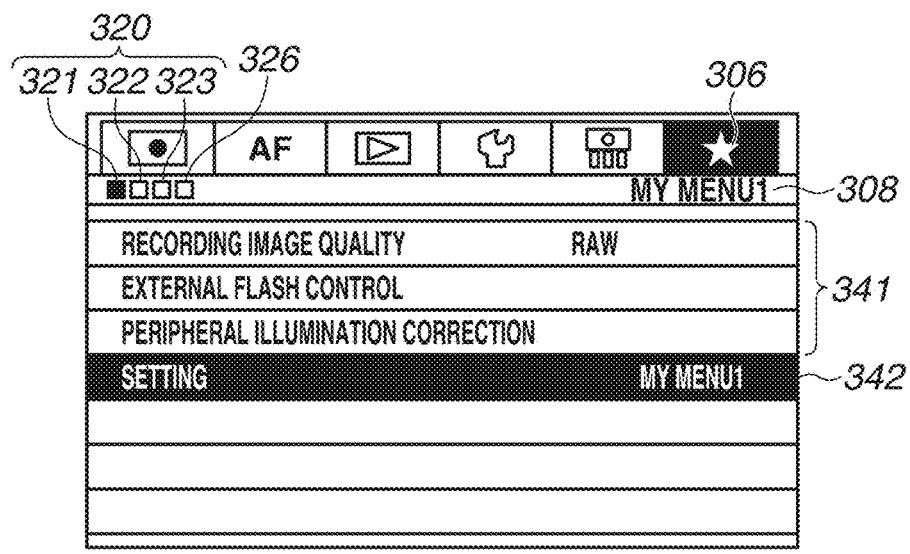

FIGS. 3B and 3C each illustrate an example of the screen when the My Menu large tab 306 is focused (selected). The My Menu large tab 306 includes a My Menu setting small tab 326 and a My Menu small tab group 320. The My Menu setting small tab 326 is a small tab that includes menu items relating to the setting of My Menu, and also includes a menu item 334 that indicates saving or reading of My Menu to/from a card. An optional menu item is additionally registrable to each tab of the My Menu small tab group 320 (predetermined group). In the example of FIG. 3B, the My Menu small tab group 320 includes a first My Menu tab 321, a second My Menu tab 322, and a third My Menu tab 323. However, the number of tabs included in the My Menu small tab group 320 is not limited thereto, and may be set by the user. In the present exemplary embodiment, five My Menu tabs can be added to the My Menu small tab group 320 at maximum. This does not intend to limit the present exemplary embodiment.

Further, the My Menu small tab group 320 and the My Menu setting small tab 326 may be different in display form from each other. For example, a color of the small tab name 308 indicating the name of each tab may be changed to allow the user to visually recognize a kind of the small tab. Further, the My Menu small tab group 320 and the My Menu setting small tab 326 may be different in display form from each other by making a color of characters different between the menu item 331 when the My Menu setting small tab 326 is focused and the menu items 341 and 342 when the My Menu small tab group 320 is focused. The My Menu small tab group 320 and the My Menu setting small tab 326 may be different in display form from each other by other methods. The different display forms allow the user to easily distinguish the My Menu small tab group 320 from the My Menu setting small tab 326.

No menu item is additionally registrable to the My Menu setting small tab 326.

FIG. 3B illustrates the example of the menu screen in a state where the My Menu setting small tab 326 is focused. The My Menu setting small tab 326 includes a plurality of menu items 331 relating to the setting of My Menu, and includes menu items respectively indicating addition of My Menu tab, deletion of all of My Menu tabs, and deletion of all of items, and a menu item 334 indicating saving or reading of My Menu to/from a card. Further, the My Menu setting small tab 326 includes a menu item indicating menu display. The menu item indicating addition of My Menu tab is a menu item for adding a My Menu tab. The menu item indicating deletion of all of My Menu tabs is a menu item for deleting all of the added My Menu tabs. The menu item indicating deletion of all of items is a menu item for deleting all of the menu items registered in the My Menu tab. The menu item 334 indicating saving or reading of My Menu to/from a card is a menu item for saving My Menu file including information of the set My Menu to a card as the recording medium 180, or for reading of My Menu file saved by the other digital camera, from a card. The menu item indicating menu display is a menu item for controlling the menu display. The system control unit 250 updates the My Menu information in the system memory 252 based on the user operation on the menu items 331 of the My Menu setting small tab 326, and performs the following processing. Specifically, the system control unit 250 performs at least any of addition or deletion of the My Menu small tab group 320, deletion of the menu item 341 registered in the My Menu small tab group 320, and saving and reading of the My Menu file.

FIG. 3C illustrates the display example of the menu screen when the My Menu small tab group 320 is focused. The My Menu small tab group 320 includes a setting 342 and menu items 341. When the user selects the setting 342, it is possible to perform registration and deletion of the menu item 341 with respect to the focused My Menu small tab group 320, and to change the tab name to be displayed on the small tab name 308. At this time, the system control unit 250 updates the My Menu information in the system memory 252 based on a user operation on the setting 342, and performs the following processing. Specifically, the system control unit 250 performs at least any of registration and deletion of the menu item 341 with respect to the focused My Menu small tab group 320, and change of the tab name to be displayed on the small tab name 308.

The number of menu items 341 registrable in the My Menu small tab group 320 may be limited to the number displayable in one screen, or may not be limited. In the present exemplary embodiment, the number of items displayable in one screen is six. This does not intend to limit the present exemplary embodiment.

The system control unit 250 performs control to display the My Menu small tab group 320 and the menu items 341 of the My Menu small tab group 320 based on the My Menu information registered in the system memory 252.

As illustrated in FIGS. 3A to 3C, the screen displayed on the display unit 128 when the user presses down the menu button has the following hierarchical structure. The hierarchical structure includes the large tabs as heads, the small tabs 320 and 326 belonging to any of the large tabs, and the menu items (e.g., menu items 309, 331, 341, and 342) belonging to any of the small tabs.

Figure 3D:
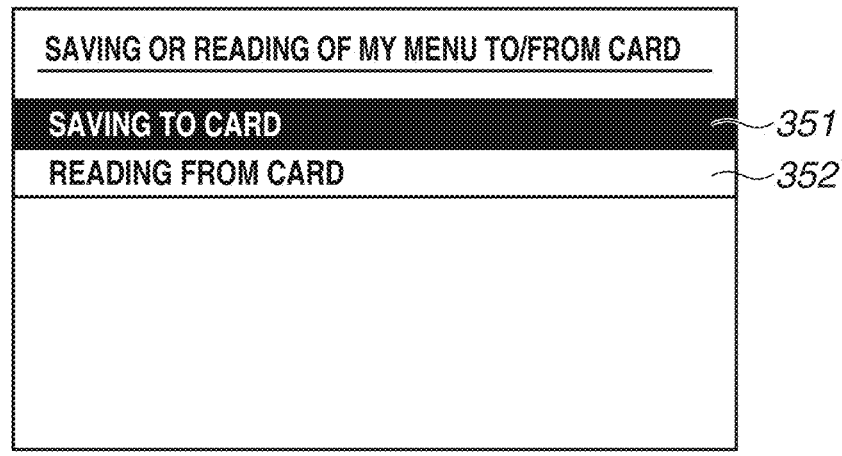

FIG. 3D illustrates a display example of the menu screen when the user selects the menu item 334 that indicates saving or reading of My Menu to/from a card. The menu item 334 indicating saving or reading of My Menu to/from a card includes a menu item 351 indicating saving to a card, and a menu item 352 indicating reading from a card. The menu item 351 indicating saving to a card is a menu item for writing the information of the set My Menu to the card as the recording medium 180. The menu item 352 indicating reading from a card is a menu item for reading the My Menu information saved by the other digital camera, from a card.

Figure 3E:
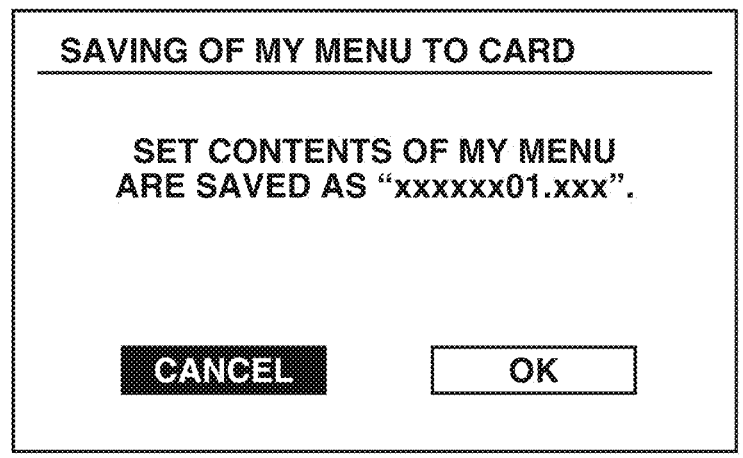

FIG. 3E illustrates a display example of a confirmation screen in a case where the user selects the menu item 351 indicating saving to a card. When the user selects "OK", the system control unit 250 performs saving processing of My Menu file that is described below with reference to FIG. 6.

Figure 3F:
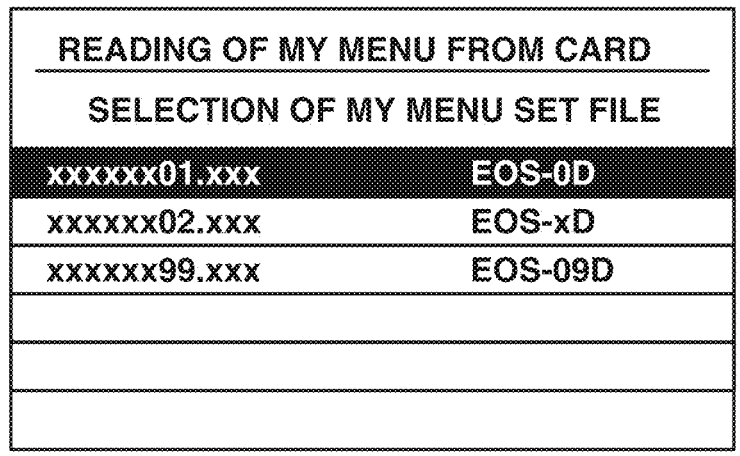

FIG. 3F illustrates a display example of a screen on which a list of My Menu files is displayed in a case where the user selects the menu item 352 indicating reading from a card. The user selects a file to be read from the list, with reference to a file name and a model name that has saved the file. List display control performed by the system control unit 250 is described below with reference to FIG. 7.

As for the list of My Menu files of FIG. 3F, only a file name may be displayed, an individual number of an imaging apparatus may be displayed together with the file name, or the user may set the file name.

Figure 3G:
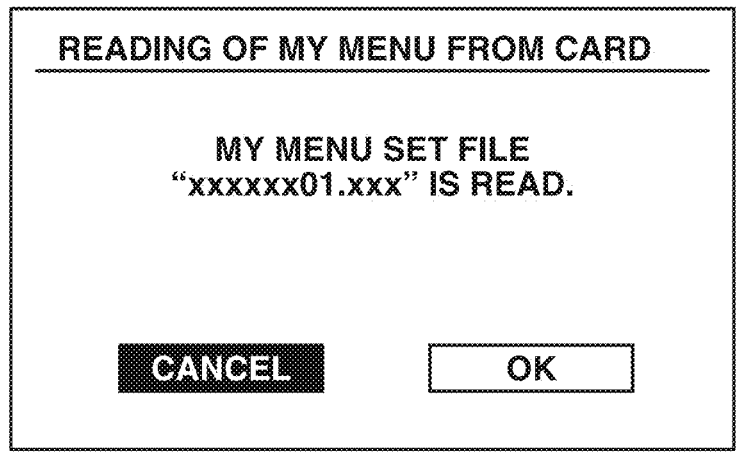

FIG. 3G illustrates a display example of a confirmation screen in a case where the user selects the My Menu file on the list display screen. When the user selects "OK", the system control unit 250 performs saving processing of My Menu file that is described below with reference to FIG. 8 and FIG. 9.

The screens respectively illustrated in FIGS. 3A to 3G are each displayed on the display unit 128 under control of the system control unit 250.

A method of controlling the My Menu file saving is first described with use of a flowchart illustrated in FIG. 6. The processing is realized when a program stored in the nonvolatile memory 256 is loaded into the system memory 252 and is executed by the system control unit 250.

It is assumed that, before the processing of FIG. 6, the menu item 351 indicating saving to a card is selected on the screen of FIG. 3D by the user through the operation unit 170, and "OK" is selected on the screen of FIG. 3E. When receiving the operation through the operation unit 170, the system control unit 250 starts the following processing.

In step S601, the system control unit 250 determines whether a My Menu file is creatable in the card as the recording medium 180. In a case where a My Menu file is not creatable due to absence of a card in the digital camera 100, a capacity shortage of the card, or other reasons (No in step S601), the processing proceeds to step S604. In a case where a My Menu file is creatable (Yes in step S601), the processing proceeds to step S602.

In step S602, the system control unit 250 acquires a file name of the My Menu file to be created, and stores the acquired file name in the system memory 252.

In step S603, the system control unit 250 acquires a product name 505, a version of correspondence information 506, correspondence information 508, and My Menu information 509 that are held by the nonvolatile memory 256.

The My Menu information 509 acquired by the system control unit 250 represents setting information of My Menu set in the digital camera 100. The My Menu information 509 to be acquired by the system control unit 250 may be held by the system memory 252. Further, the system control unit 250 acquires a size of correspondence information 507 based on the correspondence information 508. The system control unit 250 writes the acquired information in the My Menu file according to a format illustrated in FIG. 5A. The processing of FIG. 6 then ends. The correspondence information 508 of the My Menu file written in step S603 is an example of first correspondence information. The correspondence information includes a correspondence table of menu items between each model and a model older than each model. For example, in a case of a digital camera of a model C, the correspondence information indicates correspondence between menu items of the model C and menu items of a model D that is older than the model C. More specifically, the correspondence information indicates correspondence of menu items settable as My Menu of the model C and the model D.

In step S604, the system control unit 250 performs alert display that a My Menu file is not creatable, on the display unit 128. Then, the processing of FIG. 6 ends.

Figure 7:
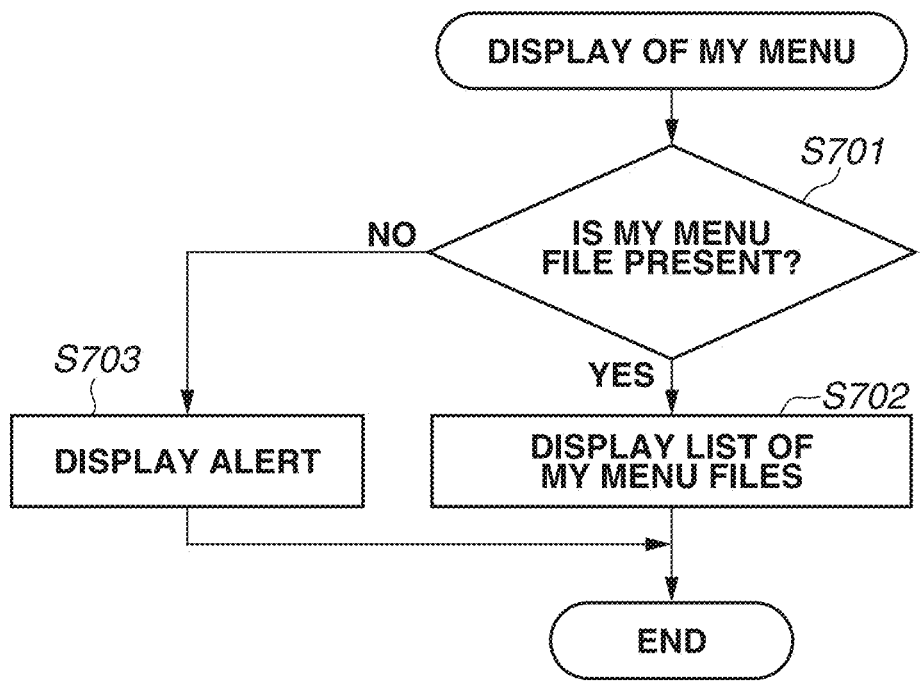
FIG. 7 is a flowchart illustrating an example of display processing of My Menu.
Figure 8:
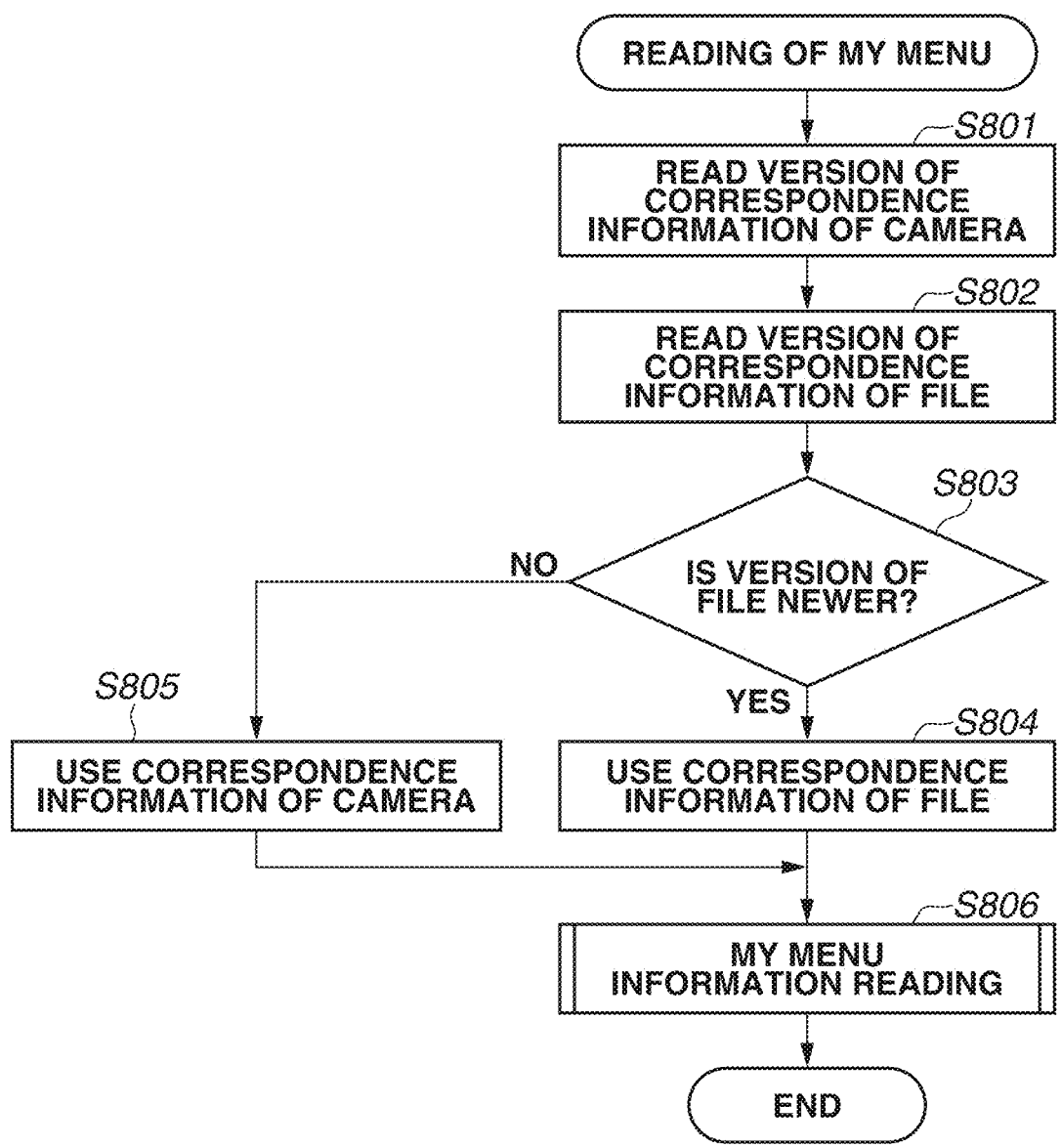
FIG. 8 is a flowchart illustrating an example of read processing of My Menu.
Figure 9B:
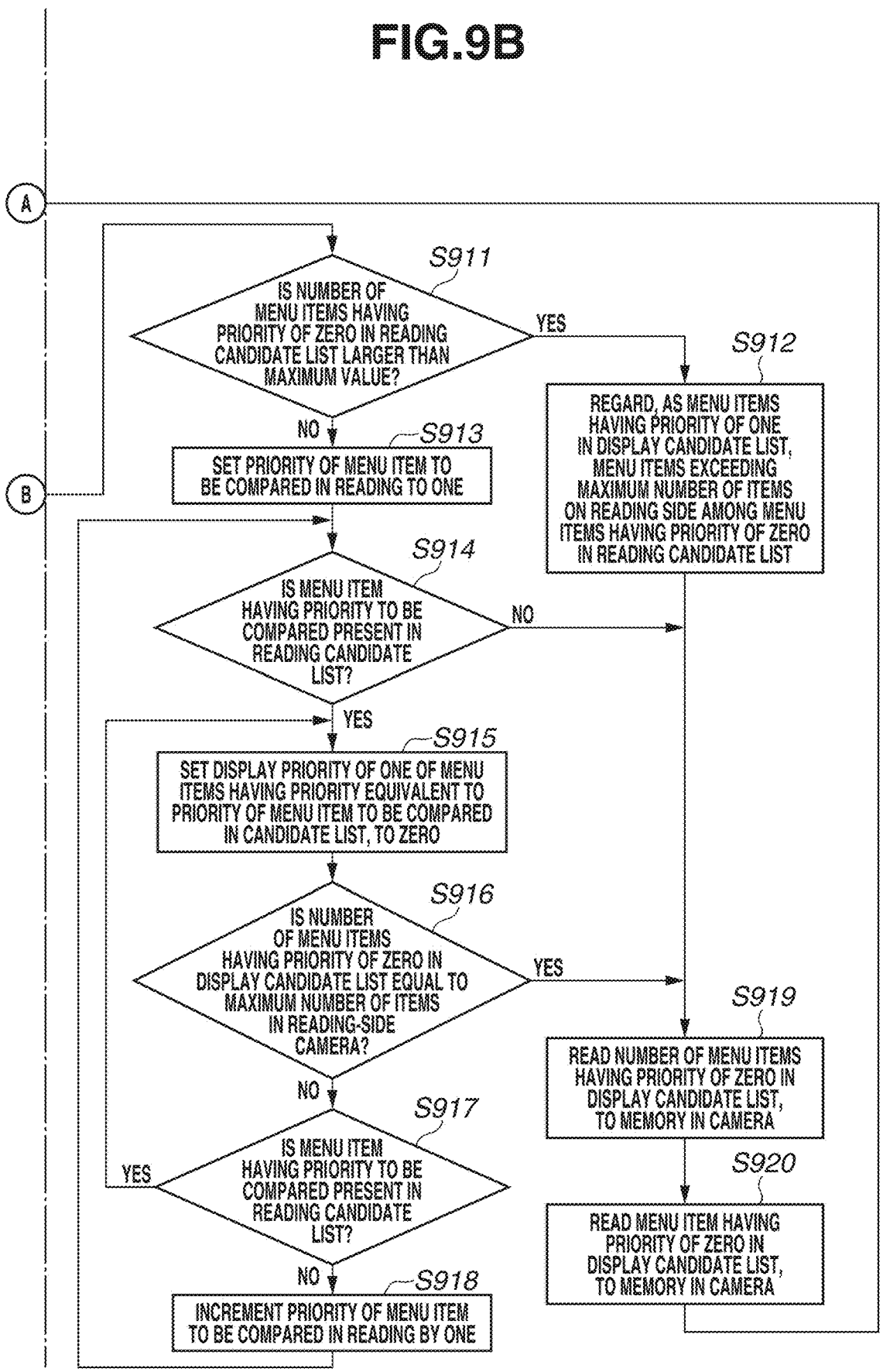
FIG. 9 (including FIGS. 9A and 9B) is a flowchart illustrating an example of read processing of the My Menu information.

Next, a method of controlling My Menu file reading is described referring to flowcharts of FIG. 7 to FIG. 9. In description of FIG. 7 to FIG. 9, the model of the digital camera 100 performing the processing of FIG. 7 to FIG. 9 is assumed to be the model B. The processing is realized when a program held by the nonvolatile memory 256 is loaded to the system memory 252 and is executed by the system control unit 250.

FIG. 7 is a flowchart illustrating display processing of My Menu to display a list of My Menu files held by the card. It is assumed that, before the processing of FIG. 7, an execution instruction to read the My Menu setting from the card is provided from the user through the operation unit 170. When receiving the execution instruction through the operation unit 170, the system control unit 250 starts the following processing.

In step S701, the system control unit 250 determines whether the My Menu file is present in the card as the recording medium 180. In a case where the My Menu file is not present (No in step S701), the processing proceeds to step S703. In a case where the My Menu file is present (Yes in step S701), the processing proceeds to step S702.

In step S702, the system control unit 250 stores, in the system memory 252, the file name of the My Menu file present in the card and the product name saved in the My Menu file, and displays the file name and the product name on the display unit 128. The processing of FIG. 7 then ends. A screen example displayed on the display unit 128 in step S702 is illustrated in FIG. 3F.

In step S703, the system control unit 250 performs alert display that the My Menu file is not present in the card, on the display unit 128. Then, the processing of FIG. 7 ends.

FIGS. 4A to 4D are examples of the menu information (table) held by the nonvolatile memory 256 of the digital camera 100.

FIGS. 4A and 4C each illustrate a list of menu items stored by the corresponding digital camera, and each illustrate numbers (menu numbers) respectively corresponding to the menu items. FIGS. 4A and 4C each illustrate the list of (accumulated) menu items that have been used in the model before the corresponding digital camera, and the menu items are different from the menu items displayed on the menu screen of the digital camera to which the menu items are recorded. A model-dependent menu list indicating the menu items displayed on the menu screen on the corresponding digital camera is illustrated in FIGS. 4B and 4D.

In a case where a menu is added, or a menu hierarchy is changed and an item name displayed as a menu item on the menu screen is changed, a menu item name and a corresponding number are added to the menu item list illustrated in FIGS. 4A and 4C. In the case where the menu item is added, the menu item is added at the end of the menu item list, and has larger corresponding menu number. Menu items are added to the menu item list one after another, and a new menu item list includes a larger number of menu items. The menu item list includes a menu item that has been present in the model recording My Menu and is not present in the model reading My Menu. For example, in the model A, a menu item that indicates lens optical correction corresponding to a new function n+1 added in the model B is not present in the menu screen.

The menu items and the menu hierarchy are different between the model A in which the menu item list of FIG. 4A is set and the model B in which the menu item list of FIG. 4C is set.

FIGS. 4B and 4D each illustrate the model-dependent menu list indicating the menu numbers of the menu items (all of menu items displayable on the menu screen) settable in the corresponding model. FIG. 4B illustrates the model-dependent menu list of the model A. FIG. 4D illustrates the model-dependent menu list of the model B. For example, in the model A, the model-dependent menu list of the model A illustrated in FIG. 4B does not include a menu item corresponding to the menu number 6. Accordingly, the menu item of finder level display associated with the menu number 6 in the menu item list illustrated in FIG. 4A is not present in the digital camera 100 of the model A. On the other hand, the menu number 4 is present in the model-dependent menu list of the model A illustrated in FIG. 4B. Therefore, the menu item of external flash control associated with the menu number 4 in the menu item list illustrated in FIG. 4A is present in the digital camera 100 of the model A. When the menu number is the same, the item name of the menu is also the same.

FIGS. 5A to 5H illustrate information relating to My Menu that is recorded in the digital camera.

FIG. 5B is a diagram illustrating a format of the My Menu file saved in the card. The My Menu file includes the product name 505, the version of correspondence information 506, the size of correspondence information 507, the correspondence information 508, and the My Menu information 509.

The product name 505 is used in the process in step 702, and is displayed on the screen of FIG. 3F.

The version of correspondence information 506 is used in a process in step S802 described below. The system control unit 250 compares the version of correspondence information 506 with the version of the correspondence information held by the digital camera that reads the My Menu file (step S803), and uses the correspondence information of new version.

The size of correspondence information 507 indicates a variable size of the correspondence information 508, and is used in a case where the correspondence information 508 is read to the system memory 252 from the My Menu file, or in a case where a location of the My Menu information 509 in the My Menu file is specified.

The correspondence information 508 is correspondence information held by the digital camera 100 that has saved the My Menu file in the card, and is used in a case where the correspondence information 508 is newer than the correspondence information held by the digital camera 100 that performs reading of the My Menu file. When the model of the digital camera 100 that has saved the My Menu file in the card is regarded as a model N, the correspondence information 508 is the correspondence information 508 of the model N. The correspondence information 508 of the My Menu file indicates correspondence between the menu items of the digital camera that has saved the My Menu file in the card and menu items settable as the menu items of My Menu in a model different from the model of the digital camera.

The My Menu information 509 represents My Menu setting registered in the digital camera 100 that has saved the My Menu file in the card, and is information in the format of FIG. 5A.

FIG. 5A is a diagram illustrating the format of the My Menu information 509 included in the My Menu file illustrated in FIG. 5B. The My Menu information 509 includes the number of tabs 501 and tab information 510 for the number of tabs 501. In a case where the number of tabs is zero, no tab information 510 is present. In a case where the number of tabs is five, five pieces of tab information 510 are present. The tab information 510 includes a name of tab 502, the number of menu items included in the tab 503, and menu items 504 included in the tab. The tabs in the My Menu information 509 represent the My Menu small tab group 320.

FIGS. 5C to 5F each illustrate an example of information held by the nonvolatile memory 256 of the digital camera 100 or the My Menu file.

FIGS. 5C and 5D each illustrate an example of the correspondence information 508. The correspondence information 508 is information to refer to a menu item corresponding to a menu item that is not present in the menu screen of the digital camera 100 when the digital camera 100 reads the My Menu file.

FIG. 5C illustrates the example of the correspondence information 508 of the model A. FIG. 5D illustrates the example of the correspondence information 508 of the model B.

As compared with FIG. 5C, information that associates the menu number 5 with the menu number n+1 is added in FIG. 5D, and peripheral illumination correction that is a menu item corresponding to the menu number 5 in the model A is displayed as lens optical correction in the model B.

Further, the correspondence information 508 illustrated in FIGS. 5C and 5D may be different in arrangement order depending on a model or a release date because priority becomes higher toward the top of the list. The priority may be represented by adding information of priority to the correspondence information 508, in addition to the arrangement order.

FIGS. 5E and 5F each illustrate the My Menu information 509 that is a specific example of FIG. 5A.

FIG. 5E illustrates an example of the My Menu information 509 that is set in the digital camera 100 of the model A through a user operation and is saved by the menu item 351 indicating saving to a card as well. In the example of FIG. 5E, the number of tabs 501A is three, a name of a first tab 502a is "mymenu1", and the number of menu items 503a of the first tab is four. The first tab includes four menu items 504a corresponding to the menu numbers 1, 8, 5, and 9. Referring to the menu item list of FIG. 4A, the menu items of 1: recording image quality, 8: in-finder display, 5: peripheral illumination correction, and 9: menu 1 are included in the first tab.

FIG. 5F illustrates an example of the My Menu information 509 that is registered in the digital camera 100 when the My Menu file including the My Menu information 509 of FIG. 5E is read by the menu item 352 indicating reading from a card. In the example of FIG. 5F, the number of tabs 501b is three, a name of a first tab 502b is "mymenu1", the number of menu items 503b of the first tab is six, and six menu items 504b are present. A case where the digital camera 100 of the model B reads the My Menu information 509 of FIG. 5E by the menu item 352 that indicates reading from a card through the user operation is considered. Collating the model-dependent menu list illustrated in FIG. 4D with the My Menu information 509 of FIG. 5E, the menu number 1 that is included in the My Menu information 509 read from the card is present but the menu numbers 8, 5, and 9 are not present. Referring to the correspondence information 508 of the model B illustrated in FIG. 5D, it is found that the menu item associated with the menu number 8 is the menu numbers 6 and 7, and the menu item associated with the menu number 5 is a menu number n+1. Further, it is found that the menu item associated with the menu number 9 is the menu numbers 10, 11, and 12. Moreover, the menu numbers 6, 7, n+1, 10, 11, and 12 that are associated menu items are included in the model-depend menu list illustrated in FIG. 4D. Accordingly, it is found that these menu items are functions present in the digital camera 100 reading the My Menu file, and these menu items become candidates of menu items to be registered in My Menu. The menu items of My Menu are also referred to as My Menu items.

FIG. 8 is a flowchart of read processing of My Menu to read the My Menu file in the digital camera 100. The processing is realized when the program recorded in the nonvolatile memory 256 is loaded into the system memory 252 and is executed by the system control unit 250. It is assumed that a selection instruction is performed on the display of the list of My Menu files saved in the card, by the user through the operation unit 170. When receiving the selection instruction through the operation unit 170, the system control unit 250 starts the following processing.

In step S801, the system control unit 250 stores, in the system memory 252, the version of the correspondence information of the digital camera 100 held by the nonvolatile memory 256. The correspondence information of the digital camera 100 indicates correspondence between the menu items in the digital camera 100 and menu items settable as the menu items of My Menu in a model different from the model of the digital camera 100. The correspondence information of the digital camera 100 is an example of each of second correspondence information and third correspondence information.

In step S802, the system control unit 250 stores, in the system memory 252, the version of correspondence information 506, illustrated in FIG. 5B, that has been read from the My Menu file selected by the user.

In step S803, the system control unit 250 compares the version of the correspondence information of the digital camera 100 that has been stored in the system memory 252 in step S801 with the version of the correspondence information read from the My Menu file that has been stored in the system memory 252 in step S802. In a case where the version of the correspondence information read from the My Menu file is newer than the version of the correspondence information of the digital camera 100 stored in step S801 (Yes in step S803), the processing proceeds to step S804. In a case where the version of the correspondence information of the digital camera 100 is newer than or equivalent to the version of the correspondence information read from the My Menu file (No in step S803), the processing proceeds to step S805.

In step S804, the system control unit 250 stores, in the system memory 252, the correspondence information read from the My Menu file selected by the user. Therefore, the correspondence information of the My Menu file is referred to in the following processes. Accordingly, the system control unit 250 creates My Menu based on the correspondence information of the My Menu file. Then, the processing proceeds to step S806.

In step S805, the system control unit 250 stores, in the system memory 252, the correspondence information held by the nonvolatile memory 256. Accordingly, the correspondence information in the digital camera 100 that is executing the processing of FIG. 8 is referred to in the following processes. Therefore, the system control unit 250 creates My Menu based on the correspondence information of the digital camera 100 that is executing the processing of FIG. 8. Then, the processing proceeds to step S806. The correspondence information of the model B (recorded in digital camera) is newer in menu list than the correspondence information of the model A (recorded in file) illustrated in FIGS. 4 and 5. Therefore, in this case, the correspondence information recorded in the digital camera 100 (FIG. 5D) is used.

In step S806, the system control unit 250 reads the My Menu information 509 from the My Menu file selected by the user, and sets My Menu in the digital camera 100. The processing of FIG. 8 then ends. The processing in step S806 is described below with reference to FIG. 9.

Next, detail of the processing of My Menu information reading that is processing of reading the My Menu information 509 from the My Menu file (S806) is described with reference to the flowchart of FIG. 9. At this time, processing of storing, in the system memory 252, the setting information of My Menu suitable for the digital camera 100 is performed. The processing is realized when the program recorded in the nonvolatile memory 256 is loaded to the system memory 252 and is executed by the system control unit 250.

In step S901, the system control unit 250 initializes the My Menu information in the system memory 252. The My Menu information in the system memory 252 indicates setting of My Menu in the digital camera 100 that executes the processing of FIG. 9.

In step S902, the system control unit 250 checks whether all of the tab information 510 in My Menu have been completely read from the My Menu file, based on the number of tabs 501 illustrated in FIG. 5A. In a case where all of the tab information 510 have been completely read (Yes in step S902), the processing proceeds to step S921. In a case where the tab information 510 that has not been read from the My Menu file is present (No in step S902), the processing proceed to step S903. In other words, the system control unit 250 determines whether all of tab information of three tabs in My Menu illustrated in FIG. 5E have been completely read. In a case where reading of the tab 1 has been completed, reading of a tab 2 is performed in step S903 or subsequent steps.

In step S903, the system control unit 250 reads, from the My Menu file, the name of tab 502 that is one of the tab information 510 illustrated in FIG. 5A, and records the name of tab 502 in the My Menu information of the system memory 252. Then, the processing proceeds to step S904.

In step S904, the system control unit 250 checks whether reading of the menu items 504 included in the tab information 510 that corresponds to the name of tab 502 read in step S903, has been completed. In a case where the reading of the menu items 504 has been completed (Yes in step S904), the processing proceeds to step S911. In a case where the menu items 504 that have not been read are present (No in step S904), the processing proceeds to step S905.

In step S905, the system control unit 250 reads one of the menu items 504 that have not been read, from the tab information 510 corresponding to the name of tab 502 read in step S903. Then, the processing proceeds to step S906. An example of the menu item 504 is illustrated in FIG. 5 that has already been described.

In step S906, the system control unit 250 checks whether the menu item 504 read in step S905 is present in the digital camera 100. In a case where the menu item 504 is present (Yes in step S906), the processing proceeds to step S907. In a case where the menu item 504 is not present (No in step S906), the processing proceeds to step S908. In the present exemplary embodiment, the digital camera 100 performing the processing of FIG. 9 is the model B. A case where My Menu (set in model A) illustrated in FIG. 5E is read in the model B is described. In this case, first in step S906, it is determined whether the menu number 1, out of the menu numbers 1, 8, 5, and 9 of the tab (504a of FIG. 5E), is present in the model B. In other words, it is determined whether the menu number 1 is present in the model-dependent menu list of FIG. 4D.

In step S907, the system control unit 250 adds, to a reading candidate list of the system memory 252, the menu item read in step S905 most recently with priority of zero. Then, the processing returns to step S904. Since the menu item of the menu number 1 is present in the model B, the menu item is added as the menu item having priority of zero, to the reading candidate list illustrated in FIG. 5G, in step S907.

On the other hand, in a case where a determination result is No in step S906, the corresponding menu item is referred to and the menu item is added to My Menu in steps S908 to S910.

In step S908, the system control unit 250 checks whether the menu item read in step S905 is present in the correspondence information stored in the system memory 252 in step S804 or S805. In a case where the menu item is present (Yes in step S908), the processing proceeds to step S909. In a case where the menu item is not present (No in step S908), the processing returns to step S904.

In step S909, the system control unit 250 checks whether the menu item associated with the menu item read in step S905 is present in the digital camera 100, by referring to the correspondence information determined in steps S803 to S805. In other words, the system control unit 250 determines whether the menu item corresponding to the read menu item is present in the digital camera 100, by referring to the correspondence information illustrated in FIG. 5D out of the correspondence information of FIGS. 5C and 5D. Out of the menu items 1, 8, 5, and 9 (504a of FIG. 5E) in the tab 1, the menu item of the menu number 8 is not present in the menu items of the model B illustrated in FIG. 4D (No in step S906). Even if the menu item recorded as My Menu is not present in the menu items on the reading side, it is found that the menu number 8 corresponds to the menu numbers 6 and 7 of the model B as illustrated in FIG. 5D through reference of the menu number in step S909. Therefore, a determination result in step S909 becomes "Yes".

In step S909, in a case where it is determined from the correspondence information determined in steps S803 to S805 that the menu item associated with the menu item read in step S905 is present in the digital camera 100 (Yes in step S909), the processing proceeds to step S910. Further, in a case where the menu item is not present (No in step S909), the processing returns to step S904. In the present exemplary embodiment, the digital camera that performs the processing of FIG. 9 is the model B. Therefore, when the correspondence information is referred to and the menu item associated with the menu item read in step S905 is included in the model-dependent menu list of FIG. 4D, the system control unit 250 performs determination as follows. Specifically, the system control unit 250 determines from the referred correspondence information that the menu item associated with the menu item read in step S905 is present in the digital camera 100.

In step S910, the system control unit 250 adds the menu item associated in the referred correspondence information, to the reading candidate list. In a case where the menu item corresponds to a plurality of menu items in the referred correspondence information, the system control unit 250 determines priority similar to the arrangement order in the correspondence information, and adds the menu items to the reading candidate list. The menu number 8 of the second menu item 504a of FIG. 5E is not present in the menu list of the model B illustrated in FIG. 4D (No in step S906), but it is found that the menu number 8 corresponds to the menu numbers 6 and 7 of the model B, by referring to the currently-referred correspondence information of FIG. 5D. In other words, it is found that the menu item corresponding to the menu number 8 in the model A corresponds to the menu numbers 6 and 7 in the model B. In step S910, the menu numbers 6 and 7 are further added with priority and are recorded in the reading candidate list. As illustrated in FIG. 5G, the menu number 6 is added with priority of one and the menu number 7 is added with priority of two in arrangement order in the referred correspondence information, and the menu numbers are then recorded in the reading candidate list. Similarly, the menu number 9 of the fourth menu item 504a in FIG. 5E is not present in the menu list of the model B illustrated in FIG. 4D (No in step S906), but it is found that the menu number 9 corresponds to the menu numbers 12, 10, and 11 of the model B, by referring to the currently-referred correspondence information of FIG. 5D. In other words, it is found that the menu item corresponding to the menu number 9 in the model A corresponds to the menu numbers 12, 10, and 11 in the model B. In step S910, the menu numbers 12, 10, and 11 are each added with priority and are then recorded in the reading candidate list. As illustrated in FIG. 5G, the menu number 12 is added with priority of one, the menu number 10 is added with priority of two, and the menu number 11 is added with priority of three in the arrangement order in the referred correspondence information, and the menu numbers are then recorded in the reading candidate list.

The display candidate list is created in the following steps S911 to S920 based on the reading candidate list created in steps S902 to S910, to display My Menu set in the model A, in the model B.

In step S911, the system control unit 250 checks whether the number of menu items each having priority of zero in the reading candidate list of the system memory 252 is equal to or larger than the maximum number of items displayable in the My Menu tab. In a case where the number of menu items each having priority of zero is equal to or larger than the maximum number of items (Yes in step S911), the processing proceeds to step S912. In a case where the number of menu items each having priority of zero is smaller than the maximum number of items (No in step S911), the processing proceeds to step S913. The maximum number of items is set to six in the present exemplary embodiment but is not limited thereto. Alternatively, the maximum number of items may be set to five, eight, or other values or can be set by the user. One menu item having priority of zero is present in the reading candidate list illustrated in FIG. 5G. Therefore, a determination result in step S911 becomes "Yes". In a case where the determination result in step S911 is "No", the menu item is recorded in the display candidate list. In other words, the item of the menu number 1 is added with priority of zero and is recorded in the display candidate list as illustrated in FIG. 5H.

In step S912, the system control unit 250 sets, as the menu items each having priority of zero in the display candidate list, the menu items of the maximum number of items among the menu items each having priority of zero included in the reading candidate list of the system memory 252. Further, the system control unit sets, as the menu items each having priority of one in the display candidate list, the menu items exceeding the maximum number of items among the menu items each having priority of zero included in the reading candidate list. The processing then proceeds to step S919. For example, if there are seven items each having priority of zero, the priority of the menu item of the seventh menu number in the reading candidate list is set to one, and the menu item is not displayed as My Menu of the model B.

In step S913, the system control unit 250 sets, to one, the priority of each of the menu items to be read in the reading candidate list, and acquires a first menu item of the reading candidate menu items each having priority of one. In addition, the system control unit 250 sets the priority of the first menu item to zero and records the first menu item in the display candidate list. In this manner, the system control unit 250 sequentially acquires the menu items each having priority of one in the reading candidate list one by one, changes the priorities of the acquired menu items from one to zero and records the menu items in the display candidate list, thereby determining the items to be displayed as My Menu. In other words, since the number of menu items each having priority of zero in the reading candidate list determined in step S911 is one, remaining five items, the priority of each of which is set to zero in the display candidate list, are determined through processes to be described below.

In step S914, the system control unit 250 determines whether a menu item having priority equivalent to priority of the menu item as a current reading target is present in the reading candidate list of the system memory 252. In other words, the system control unit 250 determines whether a menu item having priority equivalent to priority of the menu item acquired in step S913 or in step S918 described below is present in the reading candidate list. In a case of priority of one, it is determined whether the menu item having priority of one is present in FIG. 5G, other than the menu number 6. In a case where the other menu item is present (Yes in step S914), the processing proceeds to step S915. In a case where no other menu item is present (No in step S914), the processing proceeds to step S919.

In step S915, the system control unit 250 records, as the menu item having priority of zero in the display candidate list, one of the menu items having priority targeted in step S913 or S918 in the reading candidate list of the system memory 252. For example, in a case where the menu items each having priority of one in the reading candidate list are currently read, the system control unit 250 records the item of the menu number n+1 with priority of zero, in the display candidate list of FIG. 5H. The processing proceeds to step S916. In FIG. 5G, the menu items each having priority of one in the reading candidate list become the menu items each having priority of zero in the display candidate list, in step S915 at the first time. Further, in step S915 at the second time, the menu items each having priority of two in the reading candidate list become the menu items each having priority of zero in the display candidate list. As a result, the display candidate list as illustrated in FIG. 5H is obtained.

In step S916, the system control unit 250 checks whether the number of menu items each having priority of zero in the display candidate list of the system memory 252 is equal to or larger than the maximum number of items that are displayable in the My Menu tab of the digital camera 100 performing the processing of FIG. 9. In a case where the number of menu items each having priority of zero is equal to or larger than the maximum number of items (Yes in step S916), the processing proceeds to step S919. In a case where the number of menu items each having priority of zero is smaller than the maximum number of items (No in step S916), the processing proceeds to step S917. For example, in a case where the menu items each having priority of zero in the display candidate list includes three items of the menu numbers 1, 6, and n+1, a determination result in step S916 becomes "No" because the number of items is smaller than six that is the number of menu items displayable as My Menu. On the other hand, in a case where the menu numbers 12, 7, and 10 each also have priority of zero, the determination result in step S916 becomes "Yes". For example, in a case where the determination result in step S916 becomes "No" after the menu number n+1 is recorded in the display candidate list, the processing returns to step S915, and next menu item having priority of one in the reading candidate list is recorded with priority of zero in the display candidate list. Thus, the item of the menu number 12 is recorded with priority of zero in the display candidate list.

In step S917, the system control unit 250 checks whether the menu item having priority equivalent to the priority compared by the system memory 252 is present in the reading candidate list of the system memory 252. In a case where the menu item is present (Yes in step S917), the processing returns to step S915. In a case where no item is present (No in step S917), the processing proceeds to step S918. For example, in a case where the menu items of the menu numbers 6, n+1, and 12 each having priority of one in the reading candidate list of FIG. 5G have been already recorded with priority of zero in the display candidate list, and the menu item having priority of one is not present in the reading candidate list any more, a determination result in step S917 becomes "No".

In step S918, the system control unit 250 increments the priority of the menu item to be read in the reading candidate list by one (to priority of N), and acquires a first menu item of the reading candidate menu items each having priority of N. Further, the system control unit 250 sets the priority of the first menu item to zero and records the first menu item in the display candidate list. In a case where all of the items each having priority of one in the reading candidate list have been read (menu items each having priority of one have been recorded as menu items each having priority of zero in display candidate list), the system control unit 250 acquires menu items each having priority of two in the reading candidate list. In FIG. 5G, the menu item of the menu number 7 that is the first menu item having priority of two is recorded as the menu item having priority of zero in the display candidate list of FIG. 5H.

The system control unit 250 creates the display candidate list as illustrated in FIG. 5H through the processes in steps S911 to S918.

In step S919, the system control unit 250 records, in the My Menu information of the system memory 252, the number of menu items each having priority of zero in the display candidate list of the system memory 252. When the sum of the number of menu items each having priority of zero added to the reading candidate list in step S907 and the number of menu items each having priority of one or more added to the reading candidate list in step S910 becomes larger than the maximum number of items through the processes in steps S913 to S919, the following processing is performed. Specifically, the system control unit 250 performs control so as not to display the menu items exceeding the maximum number of items, in the small tab of My Menu.

In step S920, the system control unit 250 records, in the My Menu information of the system memory 252, all of the menu items each having priority of zero in the display candidate list of the system memory 252, and the processing returns to step S902. Setting of the My Menu items is performed for each My Menu tab through the processes in steps S903 to S920.

In step S921, the system control unit 250 records, in the My Menu information in the system memory 252, the number of tabs 501 read from the My Menu file, and the processing ends.

In this way, the system control unit 250 updates the My Menu information of the system memory 252 based on the My Menu file, and updates the menu items 341 of the My Menu small tab group 320 of the digital camera 100.

As described above, according to the present exemplary embodiment, the digital camera 100 performs the following processing, based on new correspondence information out of the correspondence information recorded in the digital camera 100 and the correspondence information recorded in the My Menu file. In other words, the digital camera 100 performs control to display the My Menu items recorded in the My Menu file, based on the new correspondence information.

Accordingly, even if the model of the digital camera 100 and the model that has recorded the My Menu file are different from each other, the digital camera 100 can display the My Menu items of the model that has recorded the My Menu file without special operation by the user. This makes it possible to improve operability when the menu items set as My Menu are applied to the other model.

Further, the digital camera 100 reads the My Menu file in which the My Menu information of the other digital camera has been recorded, from the card as the recording medium 180. Accordingly, even if network communication cannot be performed between the digital cameras, the setting of My Menu of the other digital camera can be reflected.

In a case where the number of tabs 501 that has been recorded in the My Menu file, illustrated in FIG. 5A, exceeds the maximum number of My Menu tabs in the digital camera 100 including the system control unit 250, the system control unit 250 may perform the following processing. Specifically, the system control unit 250 may not read the information of the My Menu tab exceeding the maximum number of My Menu tabs in the digital camera 100. Therefore, the system control unit 250 performs control so as not to display the My Menu tabs exceeding the maximum number of My Menu tabs in the digital camera 100. The maximum number of My Menu tabs is an example of the set group number, and is held by, for example, the nonvolatile memory 256. The maximum number of My Menu tabs may be variable based on the operation of the user.

Further, the system control unit 250 may record the menu items as My Menu of the digital camera 100 (model B) by increasing the tab even if the number of menu items exceeds the number of menu items recordable as My Menu. Moreover, in a case where the same menu item is recorded as the menu item having priority of zero in the display candidate list, the system control unit 250 deletes any of the same menu items.

The above-described various kinds of control described as the control performed by the system control unit 250 may be performed by one piece of hardware, or the processing may be shared by a plurality of pieces of hardware to control the entire apparatus.

The present invention has been specifically described based on the exemplary embodiments. However, the present invention is not limited to the specific exemplary embodiments, and the present invention includes various forms without departing from the scope of the present invention. Furthermore, the above-described exemplary embodiments merely illustrate one exemplary embodiment of the present invention, and the exemplary embodiments can be appropriately combined.

Further, in the above-described exemplary embodiments, the case where the present invention is applied to the digital camera has been described as an example. The application, however, is not limited to the example, and the present invention is applicable to an electronic apparatus in which items such as menu items are settable in a group such as My Menu. In other words, the present invention is applicable to a personal computer, a personal digital assistance (PDA), a mobile phone terminal, a mobile image viewer, a printer apparatus including a display, a digital photo frame, a music player, a game machine, an electronic book reader, a tablet terminal, ant other devices. Further, the present invention is applicable to a smartphone, a projector, and home electric appliances and an onboard apparatus including a display.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-088627, filed Apr. 27, 2017, which is hereby incorporated by reference herein in its entirety.

What is claimed is:

1. An electronic apparatus which is a first electronic apparatus, comprising:
    an acquiring unit configured to acquire second correspondence information indicating correspondence between a plurality of second items settable in a predetermined menu in a second electronic apparatus which is different from the first electronic apparatus and a plurality of items settable in the predetermined menu in one or more other electronic apparatus different from the second electronic apparatus, the acquiring unit being configured to acquire second select-item information indicating one or more second select-items selected from the plurality of second items in the predetermined menu in the second electronic apparatus; and
    a control unit configured to perform control to generate first select-item information indicating one or more first select-items selected in the predetermined menu in the first electronic apparatus based on the one or more second select-items selected in the second electronic apparatus, using the acquired second select-item information and one correspondence information out of first correspondence information and the second correspondence information, the first correspondence information indicating correspondence between a plurality of first items settable in the predetermined menu in the first electronic apparatus and a plurality of items settable in the predetermined menu in one or more other electronic apparatus different from the first electronic apparatus.

2. The electronic apparatus according to claim 1, the control unit is configured to perform control to generate the first select-item information using newer correspondence information out of the first correspondence information and the second correspondence information.

3. The electronic apparatus according to claim 1, wherein the control unit performs control to record, in a recording medium, the first correspondence information together with the first select-item information.

4. The electronic apparatus according to claim 1, further comprising a setting unit configured to set, in the predetermined menu, the one or more first select-items indicated by the first select-item information,
    wherein the control unit performs control to display the one or more first select-items set by the setting unit, in the predetermined menu.

5. The electronic apparatus according to claim 4, wherein, in a case where a name of a second select-item selected from the plurality of the second items in the second electronic apparatus is same as a name of a first item settable by the setting unit, the name of the second select-item is displayed as the name of the first select-item in the predetermined menu in the first electronic apparatus.

6. The electronic apparatus according to claim 4, wherein, in a case where a name of a second select-item selected from the plurality of the second items in the second electronic apparatus is not same as a name of a first settable by the setting unit, a name of a first item corresponding to the second select-item is displayed as the name of the first select-item in the predetermined menu in the first electronic apparatus.

7. The electronic apparatus according to claim 4, wherein, in a case where the number of the one or more first select-items indicated by the first select-item information exceeds a maximum number of items displayable in the predetermined menu in the first electronic apparatus, the control unit performs control not to display items exceeding the maximum number of items.

8. The electronic apparatus according to claim 7, wherein the control unit performs control not to display items exceeding the maximum number of items, based on a priority determined for each item.

9. The electronic apparatus according to claim 8, further comprising a determination unit configured to determine priority of a first item that is settable in the predetermined menu in the first electronic apparatus, as a highest priority.

10. The electronic apparatus according to claim 9, wherein the determination unit determines, based on the one correspondence information out of the first correspondence information and the second correspondence information, a priority of the item that is associated with a first item in the one correspondence information and is settable in the predetermined menu in the first electronic apparatus.

11. The electronic apparatus according to claim 1, wherein the first electronic apparatus is a digital camera.

12. An electronic apparatus, comprising:
a control unit configured to perform, in a case where an instruction to record select-item information indicating one or more select-items selected from a plurality of items settable in a predetermined menu in the electronic apparatus is inputted, control to record correspondence information together with the select-item information in a recording medium, the correspondence information indicating correspondence between a plurality of items settable in the predetermined menu in the electronic apparatus and a plurality of items settable in the predetermined menu in one or more other electronic apparatus different from the electronic apparatus.

13. The electronic apparatus according to claim 12, further comprising a setting unit configured to set the one or more select-items in the predetermined menu,
Wherein the control unit performs control to display the one or more select-items set by the setting unit, in the predetermined menu.

14. The electronic apparatus according to claim 12, wherein the correspondence information is held by a memory in the electronic apparatus, and is recorded from the memory to the recording medium.

15. The electronic apparatus according to claim 12, wherein the electronic apparatus is a digital camera.

16. An electronic apparatus which is a first electronic apparatus, comprising:
an acquiring unit configured to acquire correspondence information indicating correspondence between a plurality of second items settable in a predetermined menu in a second electronic apparatus which is different from the first electronic apparatus and a plurality of items settable in the predetermined menu in one or more other electronic apparatus different from the second electronic apparatus, the acquiring unit being configured to acquire second select-item information indicating one or more second select-items selected from the plurality of second items in the predetermined menu in a second electronic apparatus; and
a control unit configured to perform control to generate first select-item information indicating one or more first select-items selected in the predetermined menu in the first electronic apparatus based on the one or more second select-items selected in the second electronic apparatus, using the acquired second select-item information and the correspondence information.

17. A method of controlling an electronic apparatus which is a first electronic apparatus, comprising steps of:
acquiring second correspondence information indicating correspondence between a plurality of second items settable in a predetermined menu in a second electronic apparatus which is different from the first electronic apparatus and a plurality of items settable in the predetermined menu in one or more other electronic apparatus different from the second electronic apparatus, and acquiring second select-item information indicating one or more second select-items selected from the plurality of second items in the predetermined menu in the second electronic apparatus; and
performing control to generate first select-item information indicating one or more first select-items selected in the predetermined menu in the first electronic apparatus based on the one or more second select-items selected in the second electronic apparatus, using the acquired second select-item information and one correspondence information out of first correspondence information and the second correspondence information, the first correspondence information indicating correspondence between a plurality of first items settable in the predetermined menu in the first electronic apparatus and a plurality of items settable in the predetermined menu in one or more other electronic apparatus different from the first electronic apparatus.

18. A method of controlling an electronic apparatus, comprising steps of:
performing, in a case where an instruction to record select-item information indicating one or more select-items selected from a plurality of items settable in a predetermined menu in the electronic apparatus is inputted, control to record correspondence information together with the select-item information in a recording medium, the correspondence information indicating correspondence between a plurality of items settable in the predetermined menu in the electronic apparatus and a plurality of items settable in the predetermined menu in one or more other electronic apparatus different from the electronic apparatus.

19. A non-transitory computer-readable storage medium storing a program for causing a computer to execute the control method according to claim 17.

20. A non-transitory computer-readable storage medium storing a program for causing a computer to execute the control method according to claim 18.

* * * * *